(12) United States Patent
Tate

(10) Patent No.: US 12,545,376 B1
(45) Date of Patent: Feb. 10, 2026

(54) MARINE NAVIGATION SYSTEMS, METHODS, AND USER INTERFACES

(71) Applicant: Brunswick Corporation, Mettawa, IL (US)

(72) Inventor: Brandon L. Tate, Walnut Hill, IL (US)

(73) Assignee: Brunswick Corporation, Mettawa, IL (US)

( * ) Notice: Subject to any disclaimer, the term of this patent is extended or adjusted under 35 U.S.C. 154(b) by 52 days.

(21) Appl. No.: 18/516,231

(22) Filed: Nov. 21, 2023

(51) Int. Cl.
*B63B 49/00* (2006.01)
*B63B 79/15* (2020.01)
*G01C 21/20* (2006.01)

(52) U.S. Cl.
CPC .............. *B63B 49/00* (2013.01); *B63B 79/15* (2020.01); *G01C 21/203* (2013.01)

(58) Field of Classification Search
None
See application file for complete search history.

(56) References Cited

U.S. PATENT DOCUMENTS

| | | | |
|---|---|---|---|
| 1,102,244 A | 7/1914 | Cleveland | |
| 7,561,886 B1 | 7/2009 | Gonring et al. | |
| 8,924,054 B1 * | 12/2014 | Arbuckle | G05D 1/0206 701/518 |
| 9,255,807 B2 | 2/2016 | Lee et al. | |
| 9,354,809 B2 * | 5/2016 | Asahara | G01S 13/862 |
| 9,405,445 B2 * | 8/2016 | Carnevali | G09B 29/007 |
| 9,616,978 B2 * | 4/2017 | Kojima | B63B 49/00 |
| 9,690,295 B1 * | 6/2017 | Abellera | G06F 17/00 |
| 10,000,268 B1 * | 6/2018 | Poirier | H01H 25/04 |
| 10,198,005 B2 | 2/2019 | Arbuckle et al. | |
| 10,460,484 B2 | 10/2019 | Hovland et al. | |
| 10,795,366 B1 * | 10/2020 | Arbuckle | B63H 25/04 |
| 11,002,548 B2 * | 5/2021 | Kikuchi | G01C 21/20 |
| 11,091,237 B2 * | 8/2021 | Kikuchi | G08G 3/02 |
| 11,181,915 B2 * | 11/2021 | Vanhakartano | B63H 21/21 |
| 11,257,378 B2 | 2/2022 | Derginer et al. | |
| 11,403,955 B2 | 8/2022 | Derginer et al. | |
| 11,473,914 B2 | 10/2022 | Yamabayashi et al. | |
| 11,531,341 B2 * | 12/2022 | Behrendt | G05D 1/0016 |
| 11,531,343 B1 | 12/2022 | Kitchens et al. | |
| 11,618,539 B2 * | 4/2023 | Kikuchi | G08G 3/02 701/465 |
| 11,762,387 B2 * | 9/2023 | Behrendt | G06F 3/0486 701/21 |
| 11,899,465 B2 * | 2/2024 | Johnson | G05D 1/661 |
| 2016/0101838 A1 * | 4/2016 | Kojima | B63B 49/00 701/466 |
| 2019/0204085 A1 * | 7/2019 | Kikuchi | G01C 21/20 |
| 2019/0204086 A1 * | 7/2019 | Kikuchi | G01C 21/203 |

(Continued)

*Primary Examiner* — Peter D Nolan
(74) *Attorney, Agent, or Firm* — Andrus Intellectual Property Law, LLP

(57) ABSTRACT

A method of controlling navigation for a marine vessel includes receiving a user input via a user input device identifying a path direction with respect to a vessel location of the marine vessel, defining a new navigation pathway through a marine navigation area based on the path direction indicated by the user input, wherein the new navigation pathway includes a set of geographical locations between the vessel location and a navigation target location, generating a display image representing the marine navigation area and the new navigation pathway, and displaying the display image on a user interface display.

19 Claims, 10 Drawing Sheets

(56) References Cited

U.S. PATENT DOCUMENTS

| | | |
|---|---|---|
| 2020/0132467 A1 | 4/2020 | Borovac et al. |
| 2020/0247518 A1* | 8/2020 | Dannenberg ............ B63H 21/21 |
| 2021/0339835 A1* | 11/2021 | Kikuchi .................. B63B 49/00 |
| 2021/0389765 A1* | 12/2021 | Behrendt ............. G06F 3/04815 |
| 2023/0078851 A1* | 3/2023 | Behrendt .............. G06F 3/0486 |
| | | 701/21 |

* cited by examiner

MARINE NAVIGATION SYSTEMS, METHODS, AND USER INTERFACES

FIELD

The present disclosure generally relates to systems and methods of facilitating user input and/or controlling navigation for a marine vessel, including for semi-autonomous and autonomous navigation control systems.

BACKGROUND

The following U.S. Patents and publications provide background information and are incorporated herein by reference, each in its entirety:

U.S. Pat. No. 10,198,005 discloses a method for controlling movement of a marine vessel includes controlling a propulsion device to automatically maneuver the vessel along a track including a series of waypoints, and determining whether the next waypoint is a stopover waypoint at or near which the vessel is to electronically anchor. If the next waypoint is the stopover waypoint, a control module calculates a distance between the vessel and the stopover waypoint. In response to the calculated distance being less than or equal to a threshold distance, the propulsion device's thrust is decreased. In response to sensing that the vessel thereafter slows to a first threshold speed, the vessel's speed is further reduced. In response to sensing that the vessel thereafter slows to a second, lower threshold speed or passes the stopover waypoint, the propulsion device is controlled to maintain the vessel at an anchor point that is at or near the stopover waypoint.

U.S. Pat. No. 10,460,484 regards a touch screen utilized by a marine electronic device to easily enter a route in relation to a chart. The marine electronic device may automatically determine and join geographic points associated with the chart to generate a route based on a touch pattern. The marine electronic device may be configured to complete the route to form a route loop in instances in which the start and end of the touch pattern are within a predetermined distance. The completion of the route may be accomplished by connecting the end point to the start point or by "snapping" the end point to the start point, e.g. shifting the end point to the start point. Additionally or alternatively, a user may use pre-determined route snippets to quickly and easily alter a route.

U.S. Pat. No. 11,257,378 discloses a method of controlling a propulsion system on a marine vessel that includes receiving proximity measurements describing locations of one or more objects with respect to the marine vessel, receiving a command vector instructing magnitude and direction for propulsion of the marine vessel with respect to a point of navigation for the marine vessel, and then determining a funnel boundary based on the command vector. An object is identified based on the proximity measurements and determined to be within the funnel boundary, and then a propulsion adjustment command is calculated based on the command vector and an angle of the object with respect to the point of navigation. At least one propulsion device is then controlled based on the propulsion adjustment command in order to avoid the object.

U.S. Pat. No. 11,403,955 discloses a propulsion control system on a marine vessel that includes at least one propulsion device configured to propel the marine vessel and at least one proximity sensor system configured to generate proximity measurements describing a proximity of an object with respect to the marine vessel. The system further includes a controller configured to receive proximity measurements, access a preset buffer distance, and calculate a velocity limit in a direction of the object for the marine vessel based on the proximity measurements and the preset buffer distance to progressively decrease the velocity limit as the marine vessel approaches the preset buffer distance from the object.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one aspect of the disclosure, a method of controlling navigation for a marine vessel includes receiving a user input via a user input device identifying a path direction with respect to a vessel location of the marine vessel, defining a new navigation pathway through a marine navigation area based on the path direction indicated by the user input, wherein the new navigation pathway includes a set of geographical locations between the vessel location and a navigation target location, generating a display image representing the marine navigation area and the new navigation pathway, and displaying the display image on a user interface display.

In one embodiment, the method includes defining a first navigation pathway through the marine navigation area between the vessel location and the navigation target location, wherein the first navigation pathway includes a first set of geographical locations extending in a first direction from the vessel location towards the navigation target location, generating a first display image representing the marine navigation area and the first navigation pathway and displaying the first display image on the user interface display, and wherein the path direction inputted by a user is different than the first direction such that the new navigation pathway extends in a different direction with respect to the vessel location than the first navigation pathway.

In another embodiment, the method includes receiving a first user input engaging a path modification mode prior to receiving the user input identifying the path direction utilized to define the new navigation pathway.

In another embodiment, defining the new navigation pathway includes modifying the first navigation pathway through the marine navigation area based on the path direction inputted by the user. In another embodiment, the user input device and the user interface display are a touch screen and wherein the user input is a swipe on the touch screen, wherein the path direction with respect to the vessel location is based on a direction of the swipe on the touch screen. In another embodiment, the method may further include determining the direction of the swipe on the touch screen with respect to a pixel location of the vessel location in the first display image.

In another embodiment, the input device is a joystick and the user input is a joystick tilt away from a centered position, wherein the path direction with respect to the vessel location is based on a direction of the joystick tilt.

In another embodiment, the vessel location is a global position measurement from a global position measurement system describing a current global position of the marine vessel.

In another embodiment, the vessel location is a global position along a first navigation pathway describing a potential future location of the marine vessel.

In another embodiment, the method includes generating a set of cell weights based on the path direction inputted by the user, and wherein defining the new navigation pathway includes applying the cell weights to a map of the marine navigation area. In another embodiment, the method includes imaging an area around the marine vessel with an imaging system to generate image data and generating the map of the navigation area based on the image data. In another embodiment, the set of cell weights is applied such that a location proximal to the vessel location and in the path direction receives a maximum weight, and the set of cell weights is configured to decrease as a location angle differs from an angle of the path direction with respect to the vessel location. In another embodiment, the set of cell weights is configured to decrease as location distance from the vessel location increases.

In another aspect of the disclosure, a navigation system includes a user interface display on a marine vessel and a control system. The control system is configured to receive a user input via a user input device identifying a path direction with respect to a vessel location of the marine vessel, define a new navigation pathway through a marine navigation area based on the path direction indicated by the user input, wherein the new navigation pathway includes a set of geographical locations between the vessel location and a navigation target location, generate a display image representing the marine navigation area and the new navigation pathway, and display the display image on the user interface display.

In one embodiment, the control system is further configured to define a first navigation pathway through the marine navigation area between the vessel location and the navigation target location, wherein the first navigation pathway includes a first set of geographical locations extending in a first direction from the vessel location towards the navigation target location, generate a first display image representing the marine navigation area and the first navigation pathway and displaying the first display image on the user interface display, and wherein the path direction inputted by a user is different than the first direction such that the new navigation pathway extends in a different direction with respect to the vessel location than the first navigation pathway.

In another embodiment, the control system is further configured to receive a first user input engaging a path modification mode prior to receiving the user input identifying the path direction utilized to define the new navigation pathway.

In another embodiment, the user input device and the user interface display are a touch screen and wherein the user input is a swipe on the touch screen, wherein the path direction with respect to the vessel location is based on a direction of the swipe on the touch screen. In another embodiment, the control system is further configured to determine the direction of the swipe on the touch screen with respect to a pixel location of the vessel location in the first display image.

In another embodiment, the input device is a joystick and the user input is a joystick tilt away from the centered position, wherein the path direction with respect to the vessel location is based on a direction of the joystick tilt.

In another embodiment, the control system is further configured to generate a set of cell weights based on the path direction inputted by the user, and wherein defining the new navigation pathway includes applying the cell weights to a map of the marine navigation area. In another embodiment, the control system is further configured to image an area around the marine vessel with an imaging system to generate image data and generate the map of the navigation area based on the image data. In another embodiment, the set of cell weights is applied such that a location proximal to the vessel location and in the direction receives a maximum weight, and the set of cell weights is configured to decrease as location distance from the vessel location increases. In another embodiment, the set of cell weights is configured to decrease as a location angle differs from an angle of the path direction with respect to the vessel location.

BRIEF DESCRIPTION OF THE DRAWINGS

The present disclosure includes the following Figures.

DETAILED DESCRIPTION

Figure 1:
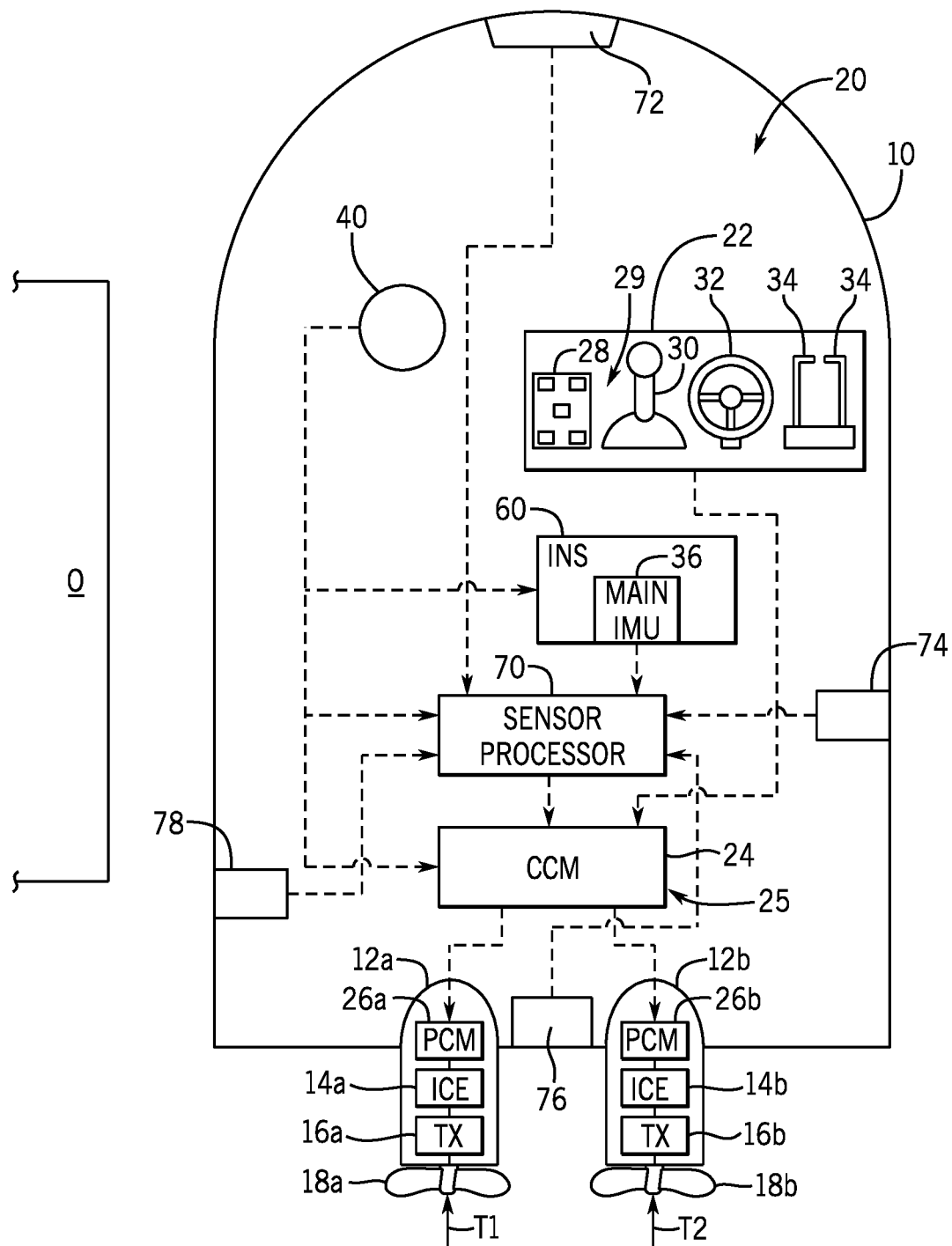
FIG. 1 is a schematic representation of an exemplary propulsion system on a marine vessel according to one embodiment of the present disclosure.

The present disclosure relates to marine vessel navigation, including autonomous navigation and semi-autonomous driver assistance systems. The inventor has recognized that there are navigational challenges associated with autonomous navigation, including scenarios in which the navigation system does not recognize the marine navigation area surrounding the marine vessel in its entirety. Thus, the vessel may encounter the previously incomplete region of the marine navigation area and may have to adjust the navigation pathway and retrace its travel path to avoid previously unrecognized objects in the marine navigation area. Upon determination of an alternative navigation pathway, time and energy is lost in the efforts of the initial navigation, the recalculation, and backtracking to navigate to the alternative navigation pathway.

Existing path planning systems and perception systems are often imperfect and/or do not meet a user's navigation preferences. The inventors have recognized that current marine navigation systems and interfaces do not offer user interfaces that facilitate easy user adjustment of a navigation path, and thus improved user interfaces are needed that are tailored to and account for the particularities of marine navigation.

Given those challenges, the inventors developed the disclosed system to provide driver assistance and/or automated control functionality to facilitate path direction user input and define a new navigation pathway between the global position of the marine vessel and the navigation target location based on a path direction indicated by user input. The inventor has devised systems and vessel control methods providing a display and user input configurations that facilitate user input of a path direction user input and automatically generate or adjust a navigation pathway through a marine navigation area based on the received path direction. For example, the control system may be configured to replace one or more of the geographic locations on the first navigation pathway. In one embodiment, the imaging system may image an area around the marine vessel to generate image data that the control system may use to generate the navigation pathway in the direction of the user input.

The user interface display may provide a plurality of selectable locations on the display, associated with a map of the marine navigation area, such as an occupancy grid, that correlates with the area surrounding the marine vessel. In one embodiment, user input selection of a path direction is used to identify a rough estimate of the desired path direction from the vessel's current location. The control system may be configured such that, once the new navigation pathway is generated based on the user inputted direction, it generates a prompt to the user to input a different path direction and/or to confirm whether the first navigation pathway is according to the user's preferences. Upon receiving user input finalizing the new navigation pathway, the new navigation pathway is set and utilized by the control system to navigate the marine vessel using autonomous or semi-autonomous navigation control.

FIG. 1 shows a marine vessel 10 equipped with a propulsion system 20 configured according to one embodiment of the disclosure. The propulsion system 20 is capable of operating, for example, in a joysticking mode where a joystick is operated by an operator to control vessel movement within an x/y plane, among other modes, as described hereinbelow. The propulsion system 20 has first and second marine drives 12a, 12b that produce first and second thrusts T1, T2 to propel the vessel 10. The first and second marine drives 12a, 12b are illustrated as outboard motors, but they could alternatively be inboard motors, stern drives, jet drives, or pod drives. In one embodiment, each marine drive 12a, 12b is provided with a powerhead, such as an engine 14a, 14b, operatively connected to a transmission 16a, 16b, in turn, operatively connected to a propeller 18a, 18b. In other embodiments, the powerhead may be an electric motor (e.g., powered by a battery or other power storage system) or a hybrid system comprising one or more of an electric motor and an internal combustion engine configured to initiate rotation of the propeller 18a, 18b.

The vessel 10 also houses various control elements that comprise part of the control system 25 for the propulsion system 20. The control system 25 comprises one or more controllers communicatively connected, and an operation console 22 in signal communication therewith, for example via a communication bus such as a CAN bus arrangement as described in U.S. Pat. No. 6,273,771. The one or more controllers of the control system 25 may comprise multiple hardware control devices communicatively connected, each including a hardware processor, such as for example a central controller 24 (e.g., shown as a command control module (CCM)) and/or propulsion control modules (PCM) 26a, 26b associated with the respective marine drives 12a, 12b. Each controller in the control system 25, such as controller 24 and the PCMs 26a, 26b, may include a memory and a programmable processor. As is conventional, each controller 24, 26a, 26b includes a processor communicatively connected to a storage system comprising a computer-readable medium that includes volatile or nonvolatile memory upon which computer-readable code and data are stored. The processor can access the computer-readable code and, upon executing the code, carry out functions, such as the navigation control functions and/or the proximity sensing functions, as described in detail below.

The control system 25 may further include one or more sensor processors 70, such as image processors configured to process the image data from the one or more image sensors 72-78. In one embodiment, an imaging system may include the one or more image sensors 72-78 and image processors and be configured to image an area around the marine vessel 10 to generate image data that the control system may use to generate the display representing the marine navigation area on the user interface display. Alternatively or additionally, the display representing the marine navigation area may be based on a global position measurement of the marine vessel 10 and/or chart data stored in memory. The global position measurement may be received by any global navigation satellite system (GNSS). Navigation data sources for the global position measurement may include standalone GNSS devices, such as a GPS constellation, GLONASS (GLObalnaya NAvigatsionnaya Sputnikovaya Sistema), Galileo, or a BeiDou receiver system, as non-limiting examples. In some embodiments, navigation data sources may also include GNSS devices that operate in conjunction with an orientation and/or motion sensing system such as an Inertial Measurement Unit (IMU), Inertial Navigational Unit (INU), and/or an Inertial Navigation System (INS). In one embodiment, the control system may define the regions of the display based on a grid system that utilizes a spatial plane, such as defined according to a known geographic coordinate system (e.g., GPS coordinates). Alternatively or additionally, the imaging system may capture measurements of distance from the marine vessel 10. The control system may generate a grid system of equivalents that correlate measurements determined from received image data to a proportional representation on the display.

Given the large amount of image data produced by the image sensors 72-78, the connection between the sensors 72-78 and the sensor processor 70 may be via a dedicated bus or network connection. This dedicated bus or network connection is separate from the vessel network to allow transmission of a large amount of proximity measurement data (and, in some embodiments, IMU data) to the sensor processor 70. Such data transmission may not be possible on a typical vessel network, such as a CAN bus or wireless network where multiple devices are communicating. In still other embodiments, a dedicated communication link may be provided between the sensor processor 70 and the propulsion controller, such as the central controller 24.

The operation console 22 includes a number of user input devices, such as a keypad 28, a joystick 30, a steering wheel 32, and one or more throttle/shift levers 34. The operation console 22 may further include an operation console display 29, such as may be associated with an onboard management system and/or a user interface, that is configured to visually present information to the operator (e.g., information regarding control mode and control settings), present control options to the operator, and receive user input from the operator in response to the control options. One example of such a display system is VesselView® by Mercury Marine Company of Fond du Lac, Wisconsin. The operation console 22 and user interface system may further include one or more mobile devices not positioned at the helm of the vessel, such as a user's mobile device communicating with the control system 25 via an application, such as via VesselView Mobile® by Mercury Marine. Each of these devices inputs commands to the control system 25. Controllers 24 within the control system 25, in turn, communicate control instructions to the first and second marine drives 12a, 12b by communicating with the PCMs 26a, 26b. The steering wheel 32 and the throttle/shift levers 34 function in a conventional manner such that rotation of the steering wheel 32, for example, activates a transducer that provides a signal to the controller 24 regarding a desired direction of the vessel 10. The controller 24, in turn, sends signals to the PCMs 26a, 26b (and/or TVMs or additional modules if provided), which in turn activate steering actuators to achieve desired orientations of the marine drives 12a, 12b. The marine drives 12a, 12b are independently steerable about their steering axes. The throttle/shift levers 34 send signals to the controller 24 regarding the desired gear (forward, reverse, or neutral) of the transmissions 16a, 16b and/or the desired rotational speed of the engines 14a, 14b of the marine drives 12a, 12b. The controller 24, in turn, sends signals to the PCMs 26a, 26b, which in turn activate electromechanical actuators in the transmissions 16a, 16b and engines 14a, 14b for shift and throttle, respectively. A manually operable input device, such as the joystick 30, can also be used to provide control input signals to the controller 24. The joystick 30 can be used to allow the operator of the vessel 10 to manually maneuver the vessel 10, such as to achieve lateral translation or rotation of the vessel 10. In one embodiment, upon activating a path modification mode, the joystick 30 may instead be used to indicate a path direction with respect to a vessel location of the marine vessel.

The propulsion system 20 also includes one or more image sensors 72, 74, 76, and 78. Although one proximity sensor is shown on each of the bow, stern, port and starboard sides of the vessel 10, fewer or more sensors could be provided at each location and/or provided at other locations, such as on the hardtop of the vessel 10. The image sensors 72-78 include visual light sensors, distance sensors, and/or directional sensors configured to generate image data. For example, each of the image sensors 72-78 may be any one of a radar sensor, sonar sensor, standard visual light camera, stereovision camera or other camera configured to measure depth information, laser sensor (e.g. lidar or Leddar), Doppler direction finder, or other devices individually capable of determining both the distance and direction (at least approximately), i.e. the relative position of an object O with respect to the vessel 10, such as a dock, a seawall, a piling, another vessel, etc. The sensors 72-78 provide information regarding both a direction of the object with respect to the marine vessel 10 and the shortest distance between object O and the vessel 10.

Regarding the image sensors 72, 74, 76, 78, note that different types of sensors may be used depending on the distance between the vessel 10 and the object O and/or its relative direction to the vessel 10. For example, radar sensors may be used to detect objects at further distances. Once the vessel 10 comes within a particular distance of the object, lidar, ultrasonic, Leddar, or sonar sensors may instead be used. Camera sensors (such as including one or more stereovision cameras) may be used, alone or in combination with any of the sensors mentioned above, in order to provide object proximity information to the CCM 24. Sensors are placed at positions on the vessel 10 so that they are at the correct height and facing direction to detect objects the vessel 10 is likely to encounter. Optimal sensor positions will vary depending on vessel size and configuration.

The sensor processor may use a subset of the plurality of available sensors for navigation or may use all available sensor data from all sensor types, which may be reviewed real-time as it is received or may be formulated into one or more maps or occupancy grids integrating some or all the proximity measurement data, where the mapped data from the operated sensors is processed as described herein. In such an embodiment, the proximity measurements and other information from the image data from each of the various sensors are all translated into a common reference frame, such as represented in a point cloud, occupancy grid, or other map of the environment. In one embodiment, the control system is configured to correlate these maps or occupancy grids with a grid of the display and/or with one or more selectable locations on the display of the marine navigation area.

Autonomous and/or advanced operator assistance (i.e., semi-autonomous) controls for improved vessel handling qualities may require the placement of multiple image sensors on the vessel 10. In general, these various types of proximity sensing devices (examples described above) are positioned to detect the presence of objects in the marine environment surrounding the marine vessel 10, such as a dock, swimmer, or other obstruction in the path of the vessel. Each sensor reports proximity relative to its own frame of reference—i.e., the distance from the sensor to the object as measured along the view angle of the sensor. Depending on the type of sensor, the application of use, boat size, hull shape, etc., multiple sensor types and sensor locations may be required to provide adequate proximity sensing around the marine vessel 10 for operation in all marine environments. To create a cohesive dataset that can be used for purposes of vessel control and vessel navigation, including autonomous vessel navigation and semi-autonomous control (such as automatic maneuver-limiting control), all of the data sources are preferably translated to a common reference frame. This requires precise knowledge of the location and orientation of each sensor relative to the common reference frame such that the data measured therefrom can be translated appropriately.

In the example of FIG. 1, an inertial measurement unit (IMU) 36 is installed at a known location on the marine vessel with respect to a predefined point of navigation, such as the center of rotation (COR) or center of gravity (COG). The installation orientation or the IMU 36 is also known. The installation locations of the IMU 36 and each proximity sensor 72-78 are established as part of a calibration procedure for the proximity sensing system.

Referencing the example in FIG. 1, the IMU 36 may be part of an inertial navigation system (INS) such as including one or more micro-electro-mechanical systems (MEMS). For example, the INS 60 may consist of a MEMS angular rate sensor, such as a rate gyro, a MEMS accelerometer, and a magnetometer. Such INS systems are well known in the relevant art. In other embodiments, the motion and angular position (including pitch, roll, and yaw) may be sensed by a differently configured INS 60, or by an attitude heading reference system (AHRS) that provides 3D orientation of the marine vessel 10 by integrating gyroscopic measurements, accelerometer data, and magnetometer data.

The INS 60 receives orientation information from the IMU 36 and may also receive information from a GPS receiver 40 comprising part of a global positioning system (GPS). The GPS receiver 40 is located at a pre-selected fixed position on the vessel 10, which provides information related to global position of the marine vessel 10. The IMU 36 is also located at a known and fixed position with respect to the center of navigation determined for the marine vessel 10, such as the COR or COG. In one embodiment, the control system may visually represent the global position of the marine vessel 10 on the display of the marine navigation area.

The inventor has recognized that the above-mentioned operational challenges posed by a marine environment can be effectively dealt with by establishing and maintaining a buffer distance around the marine vessel, where the control authority provided to an operator is limited based on the buffer distance. For example, the control system 25 may continuously calculate a maximum velocity, or velocity limit, for the marine vessel as it approaches an object O, and may limit an operator's authority in controlling the propulsion of the marine vessel 10 such that the propulsion system will not effectuate a thrust that will cause the marine vessel to travel toward the object at a velocity that is greater than the velocity limit. Thus, the propulsion system does not respond to, or carry out, commands that would cause the vessel to violate the buffer distance and venture too close to an object. In certain embodiments, the propulsion control system may be configured to automatically maintain a predetermined buffer distance between the marine vessel 10 and an object O, such as to automatically effectuate propulsion controls to force the marine vessel 10 away from the object O when the buffer zone is violated.

Figure 2:
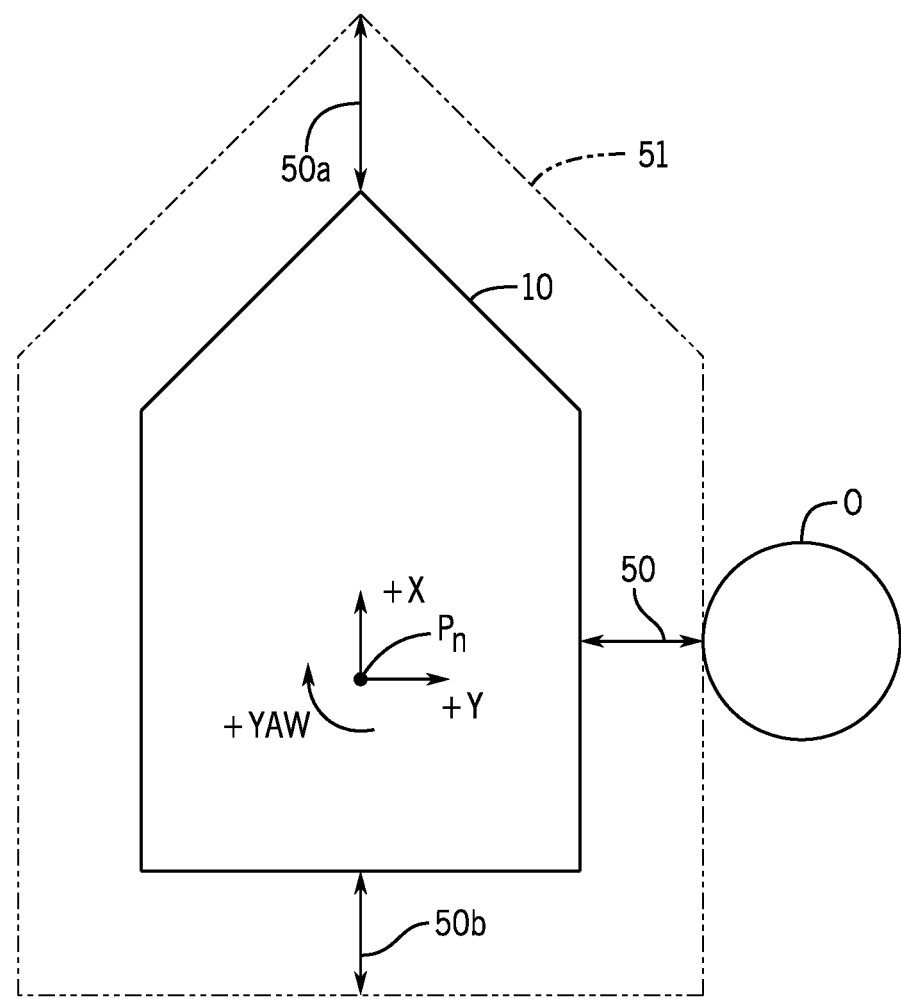
FIG. 2 schematically illustrates one implementation of a buffer distance maintained between a marine vessel and an object according to one embodiment of the present disclosure.

FIG. 2 is a diagram exemplifying this concept, where the marine vessel 10 is maintained at least the predetermined buffer distance 50 from the object O. A buffer zone 51 around the marine vessel 10 is defined, and velocity limits are calculated to progressively decrease the vessel velocity as it approaches the preset buffer distance 50 from the object O. In the depicted embodiment, the buffer zone 51 is established at a preset buffer distance 50 that is equal around all sides of the marine vessel. In certain embodiments, the buffer zone 51 may be asymmetrical with respect to the marine vessel, such as to provide a greater buffer distance 50a at the front side of the marine vessel than the buffer distance 50b on the rear side of the marine vessel. Similarly, a buffer distance on the starboard and port sides of the marine vessel 10 may be set the same or different than the front and rear buffer distances 50a, 50b.

In other embodiments, the control system 25 provides autonomous control of propulsion so as to navigate the marine vessel 10 in tight spaces, such as during docking and launch. The inventor has recognized that docking a marine vessel is a challenging task, especially with external factors common in marine environments, such as wind, waves, and current. Accordingly, the inventor has recognized that autonomous control may be beneficial for certain marine vessel control tasks, especially those tasks requiring high visibility at all points around the marine vessel and/or precise propulsion control. Accordingly, the control system 25 may be configured to execute steps to move the marine vessel safely along a predefined navigation pathway to a navigation target location, which may be performed autonomously utilizing advanced closed-loop control in conjunction with image sensors at key points around the marine vessel.

The autonomous or semi-autonomous control algorithms, such as effectuated by the control system 25, include velocity control software performing algorithms to calculate a maximum velocity for the marine vessel 10 as it approaches an object O or a navigation target location. Where propulsion control is based on user input, the control system 25 may calculate a maximum velocity for the vessel and effectuate velocity limits accordingly. In one embodiment, the velocity limits may be calculated based on a known maximum acceleration for the marine vessel. The maximum acceleration for the marine vessel may be based on the maximum vessel capabilities, such as the maximum positive or negative acceleration that can be effectuated by the propulsion system on the marine vessel 10 in the relevant direction of travel. Alternatively or additionally, the maximum acceleration for the marine vessel 10 may be predetermined, such as based on handling, comfort, or safety metrics.

Figure 3:
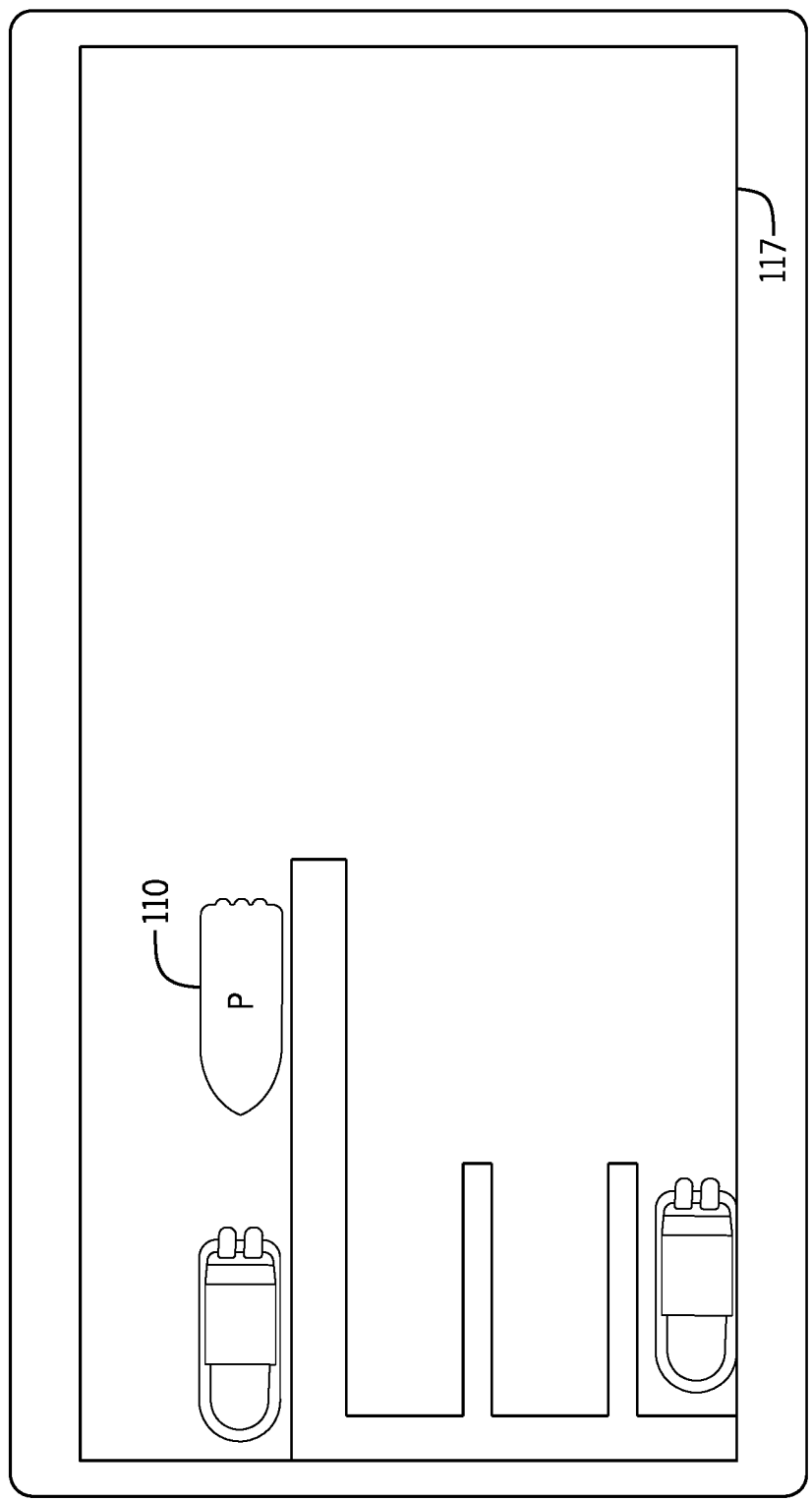
FIG. 3 illustrates a display representing a vessel at a navigation target location within a marine navigation area according to one embodiment of the present disclosure.

In certain embodiments, the control system 25 may be configured to identify potential docking surfaces in the marine environment around the vessel 10 based on the proximity measurements by the various image sensors 72-78. Referring now to FIG. 3, a navigation target location 110 within a marine navigation area is illustrated. In one embodiment, the navigation target location 110 may be a desired future location of the marine vessel within the marine navigation area. User input is received by the control system as the user selects a location on the display 117 of the user interface that represents the marine navigation area. In one embodiment, the control system may present one or more selectable locations as options for navigation target locations 110. In another embodiment, the control system may access a stored buffer zone (from predetermined settings or an accessible database stored in memory) and account for any buffer distances when placing a navigation target location 110. The control system may place the navigation target location 110 as close to the geographic location correlated to the selected location on the display 117 as possible. In one embodiment, placement of the navigation target location 110 is determined by matching a known location such as such as the center of rotation (COR) or center of gravity (COG) to the closest geographical location associated with the selected location on the display.

Figure 4:
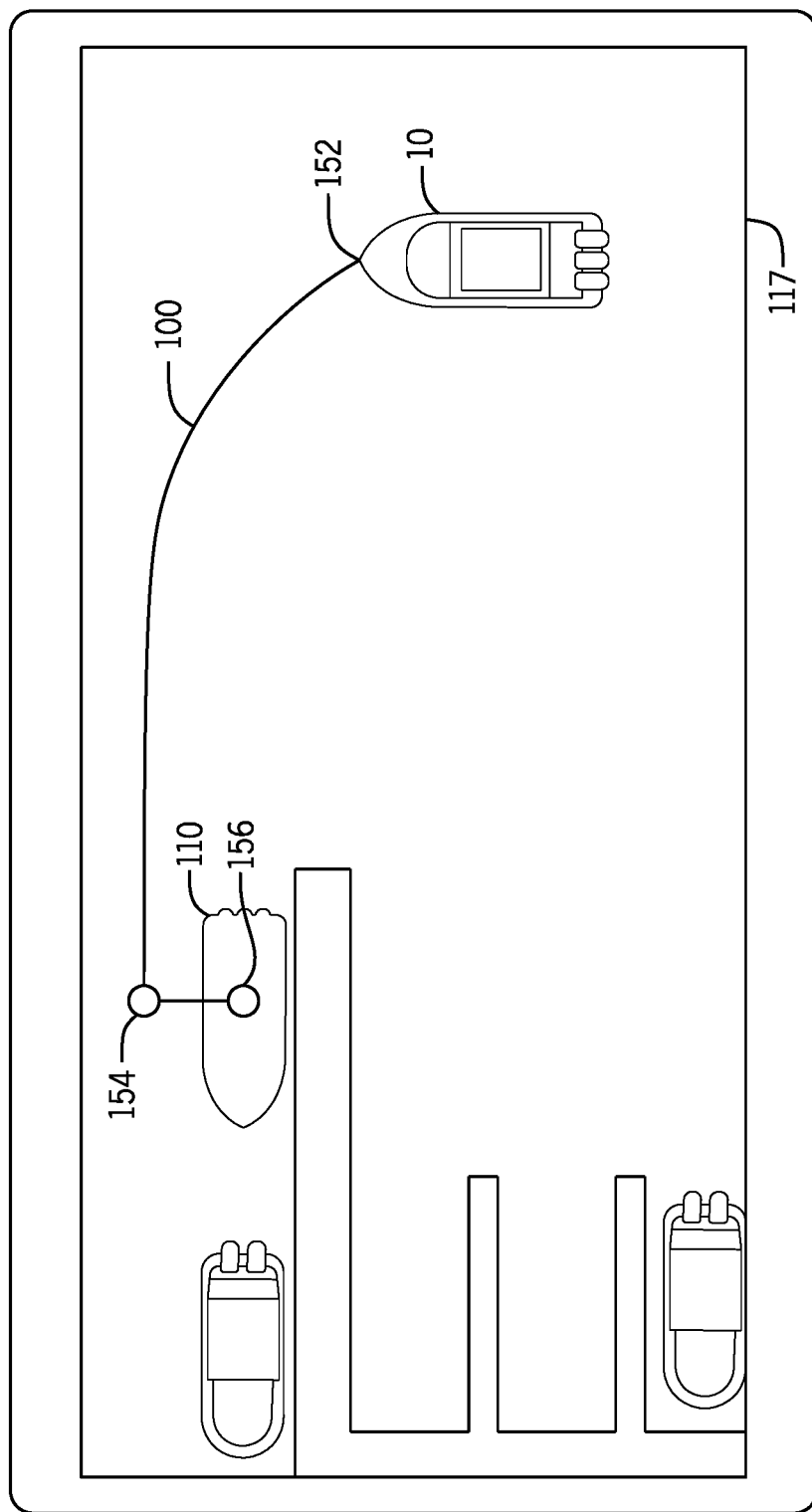
FIG. 4 is an exemplary display of a marine navigation area indicating a navigation target location and a navigation pathway according to one embodiment of the present disclosure.

Referring now to FIG. 4, the control system may receive a global position measurement describing a current global position of the marine vessel 10. The control system may define a first navigation pathway 100 through the marine navigation area between the current global position of the marine vessel 10 and the navigation target location 110. In one embodiment, the first navigation pathway 100 may include a first set of geographical locations indicating the geographical location of the first navigation pathway 100. The control system may generate a display 117 on the user interface that represents the marine navigation area and the first navigation pathway 100. The first set of geographical locations defining the first navigation pathway 100 may include a start point 152 and/or an end point 156. The first navigation pathway 100 may include one or more turn points 154. At a turn point 154, the thrust direction may change, such as between surge and sway or surge and yaw as the marine vessel 10 navigates towards the navigation target location 100.

In one embodiment, the imaging system may image an area around the marine vessel 10 to generate image data. The control system may use this image data to determine the first navigation pathway and/or the new navigation pathway described with respect to FIGS. 4 and/or 7. Similarly, the control system may generate the display representing the marine navigation area on the user interface based on the image data. In another embodiment, the control system may identify at least one object in the image data between the vessel location of the marine vessel 10, such as the current measured global position of the vessel, and the navigation target location 110 and define the first navigation pathway 100 as a pathway that avoids the identified object(s). The control system may define the first navigation pathway 100 and/or a new navigation pathway based on a user-inputted path direction to maintain a predetermined distance from the identified object, which may be an above-water object or a below-water object, such as a shallow area.

In one embodiment, upon generating the display 117 representing the marine navigation area and the first navigation pathway 100 between the global position of the marine vessel 10 and the navigation target location 110, the control system may prompt a user to confirm or adjust the first navigation pathway 100. The presentation of the first navigation pathway 100 on the display 117 may allow the user to preview the first navigation pathway 100 before the marine vessel is in motion. Adjustments to the first navigation pathway 100 received by the control system may navigate the marine vessel around obstacles that the control system may not detect, but that are perceived or otherwise identified by the user. As another example, the imaging system may only be configured to identify objects of a threshold size, such as that are larger than the size of a basketball. A user may perceive smaller objects that are not perceived by the perception system, or may choose to give a wider berth to certain objects that may be insufficiently perceived or misperceived by the perception system. Accordingly, the user may provide input identifying a new path direction for navigation from the vessel's current or potential future location, and the system may be configured to adjust the first path or replot an entirely different path based on the user's input. Thus user input received by the control system may indicate a path direction to define a new navigation pathway that will avoid such objects.

Figure 5:
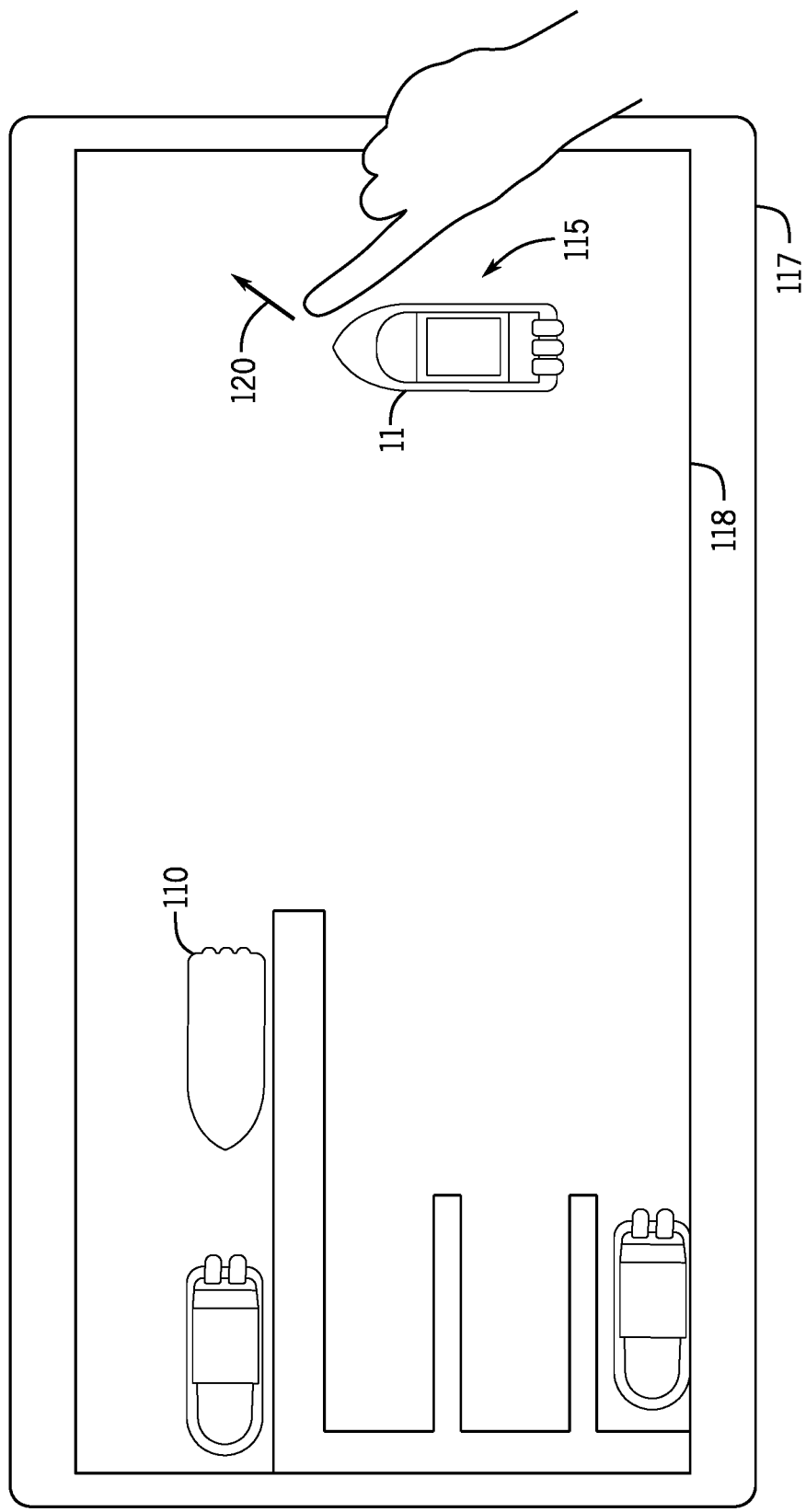
FIG. 5 is an exemplary display of a marine navigation area indicating a path direction according to one embodiment of the present disclosure.

Referring now to FIG. 5, an exemplary display of a marine navigation area receiving a user input identifying a path direction 120 is illustrated. In some embodiments, the control system may receive a path direction 120 from the user indicating a desired path direction before any navigation pathway has been defined. Alternatively or additionally, the control system may present a first navigation pathway, wherein presentation of the first navigation pathway includes the generation of a display image 118 representing the marine navigation area around the marine vessel, as depicted by a vessel icon 11, and the first navigation pathway. The first navigation pathway through the marine navigation area may include a first set of geographical locations extending in a first direction from the vessel location 115 towards the navigation target location 110. The control system may then receive user input that specifies a path direction 120 that is different than the direction of the first navigation pathway.

The user provides an input that identifies a direction with respect to the vessel. For example, the user input identifying the path direction 120 may be provided by a user at a touchscreen display, such as by a user swiping the screen next to and in a direction away from an vessel icon 11 representing the current location (or a potential future location) of the vessel on the display image 118 or by touching an area of the screen over a portion of the display image 118 that is in the desired path direction with respect to the vessel icon 11. Alternatively, the user input may be provided via another user input device, such as via a joystick, trackpad, trackball, keypad, knob (such as a physical knob on the console or a digital knob on a display screen), or any other user input device that can be configured to receive user input of a direction. For example, the control system may be configured to interpret a user's tilt of the joystick as indicating a direction with respect to the marine vessel, where the tilt direction from center represents the path direction with respect to the vessel location. Alternatively or additionally, the user input device may be a keypad with selectable direction keys.

In some embodiments, the control system may be configured to activate a path modification mode prior to receiving the path direction user input. The control system may activate the path modification mode upon receiving a user input instructing activation of the path modification mode. The path direction 120 inputted by the user may be utilized by the control system to modify the first navigation pathway or generate the new navigation pathway on its own without consideration of any prior-generated navigation pathway. In one embodiment, the control system may generate a display image 118 representing the marine navigation area and the new navigation pathway and display the display image 118 on a user interface display 117.

In one embodiment, the control system may generate a set of cell weights based on the path direction 120 inputted by the user, wherein the new navigation pathway is generated by applying the set of cell weights to the map of the marine navigation area. The set of cell weights may be applied such that a location proximal to the vessel location 115 and in the path direction identified by the user receives a maximum weight. The set of cell weights may be configured to decrease as a location angle differs from an angle of the path direction with respect to the vessel location 115. The location angle may be the angle between a reference axis and a line from a particular location in the mapped environment around the vessel to the vessel's current measured location. The reference axis may be defined by, for example, a cardinal direction or a current heading direction of the vessel, such as measured by a compass, INS, or GNSS. Alternatively, the location angle may be the angle between an axis defined by the user-instructed path direction. Additionally or alternatively, the set of cell weights may be configured to decrease as location distance from the vessel location 115 increases.

Figure 6:
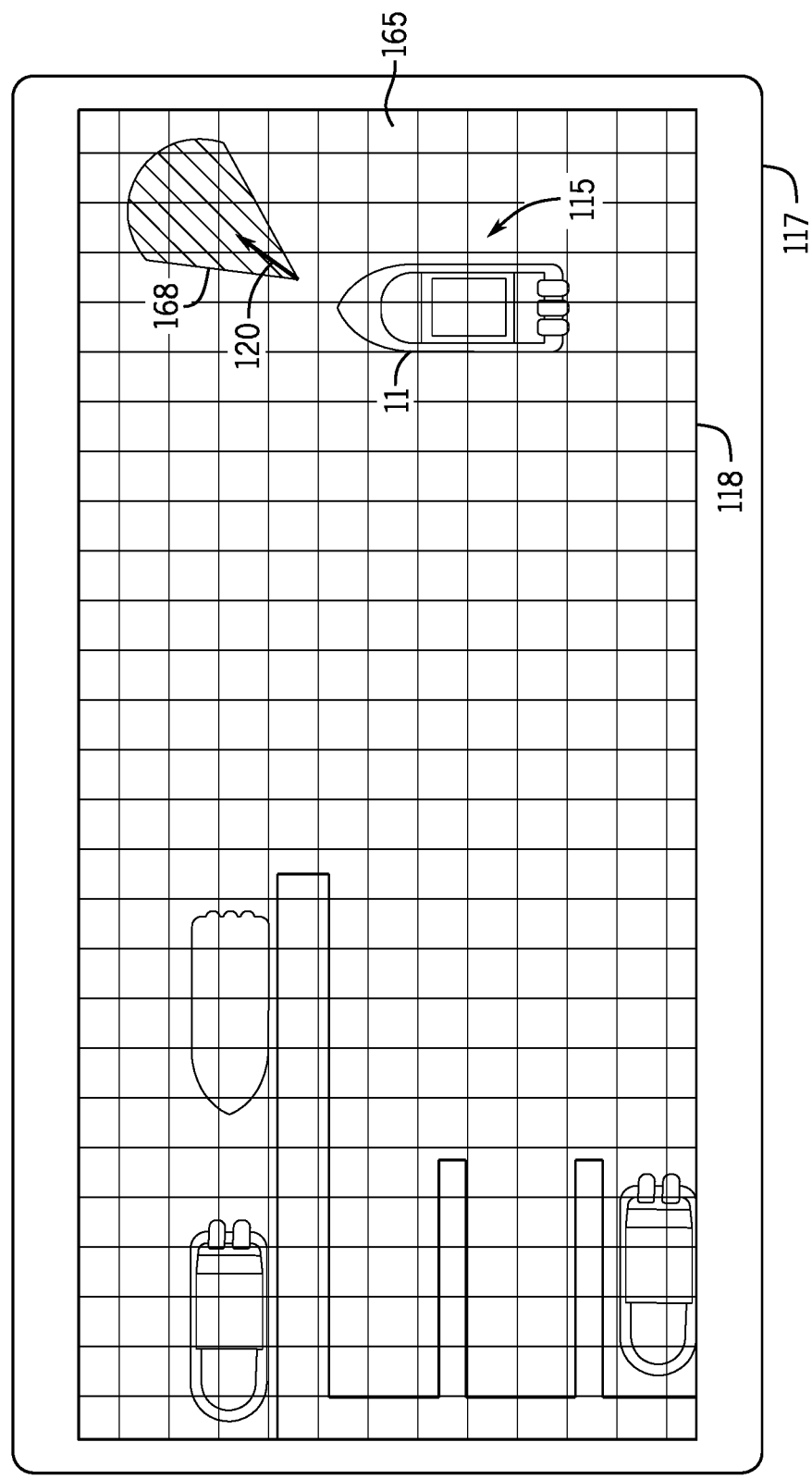
FIG. 6 is an exemplary display of a marine navigation area and illustrates a set of cell weights associated with a path direction inputted by a user.

The control system may be configured to associate touch sensor locations on a touch screen display with map locations on a map of the marine navigation area (such as an occupancy grid) that utilizes a spatial plane, such as defined according to a known geographic coordinate system and/or map/chart data. Alternatively or additionally, the navigation system may include an imaging system that captures image data that contains measurements of distance from the marine vessel. Turning to FIG. 6, the control system may be configured to correlate a sensor grid 165 of the user interface display to locations a displayed portion of a map of the marine navigation area (such as an occupancy grid). In such an embodiment, the user input identifying the path direction may be a swipe on the touch screen, wherein the path direction 120 with respect to the vessel location 115 is based on a location and direction of the swipe on the touch screen. Determining the direction of the swipe on the touch screen may include the determination of the pixel location of the vessel location 115 and/or vessel icon 11 in the display image 118. Similar mapping may be used to determine the path direction 120 of the swipe received on the user interface display 117 and its associated direction within the marine navigation area.

In one embodiment, pixel locations of the display image 118 within the sensor grid 165 may be associated with locations within the navigation area map grid system, wherein selections on the sensor grid received as user input may indicate cells within the navigation area map grid system that should receive a weight adjustment by the control system. Each cell within the map of the marine navigation area may be assigned a weight, wherein the weight determines the navigation priority, or navigability, of a location in the marine navigation area. Cell weight may be increased or decreased so the control system may account for desired and undesired geographical locations within the marine navigation area while determine the navigation of the marine vessel 10 within the marine navigation area. For example, areas to avoid within the marine navigation area may have an assigned weight that indicates that any navigation pathway should be generated avoid those areas. In such an embodiment, the control system is configured to generate a set of cell weights 168 based on the path direction 120 inputted by the user. The control system utilizes the cell weights in conjunction with the map of the marine navigation area, wherein the control system uses cell weights 168 to prioritize areas associated with path direction 120 define the direction of the new navigation pathway. The set of cell weights 168 may be configured such that locations and angles away from the path direction are weighted less, where the weights taper as the location angle differs from the path direction and/or as the distance from the vessel increases. Thus, location proximal to the vessel location 115 and in the direction of the path direction 120 receives a maximum weight, and the set of cell weights 168 is configured to decrease as a location angle differs from an angle of the path direction 120 and/or the location distance becomes further from the vessel location 115.

Figure 7:
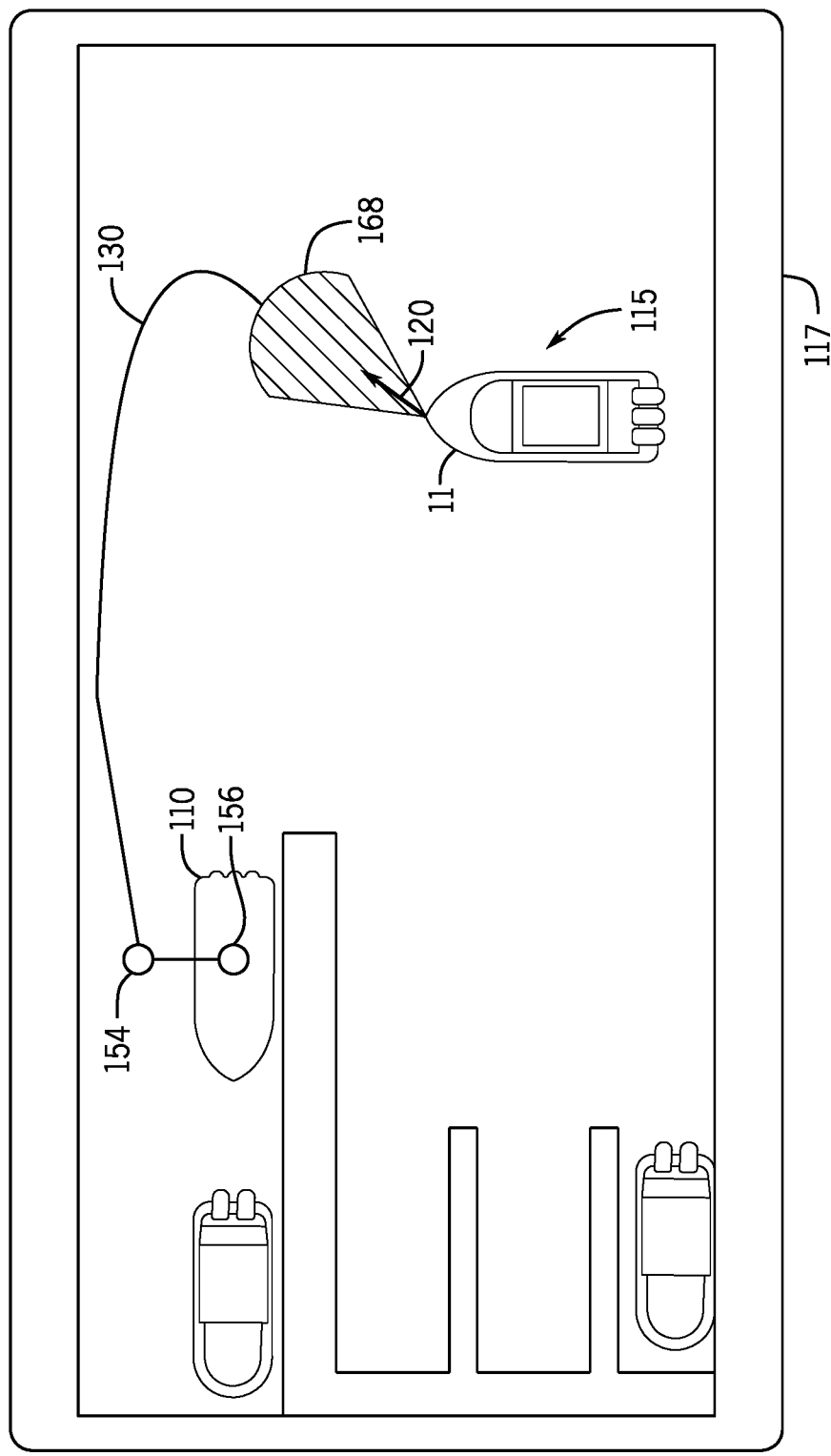
FIG. 7 is an exemplary display representing a new navigation pathway wherein the new navigation pathway extends in a different direction from a first navigation pathway according to one embodiment of the present disclosure.

FIG. 7 illustrates generation of a new navigation pathway 130, wherein the new navigation pathway 130 extends in a different direction from a first navigation pathway 100 and in the path direction 120 inputted by the user. The set of geographical locations associated with the new navigation pathway 130 may include the same start point, turn point 154, an end point 156 as the first navigation pathway 100, and additional overlap depending on the path direction and the length of the first navigation pathway.

Upon receiving a path direction 120 inputted by a user, the control system defines the new navigation pathway 130 based on the path direction, such as utilizing the cell weights. Thus, the path planning algorithm will prefer the inputted path direction 120 and following the maximum weighted region of the set of cell weights centered on the path direction 120. However, depending on the location of surrounding objects and configurations of the path planning algorithm (such as object avoidance distance, preferences for continuous forward movement versus turning in place, etc.), the new navigation pathway may diverge from the maximum weighted region of the set of cell weights 168. The same path planning algorithm as used for generating the first navigation pathway may be used for generating the new navigation pathway, except accounting for the set of cell weights indicating the new path direction. As the cell weights decrease as the location distance from the vessel location 115 increases, the new navigation pathway 130 will veer toward the first navigation pathway 100 and/or toward the navigation target location 110.

In one embodiment, the control system may receive two or more path directions, inputted by the user configured to specify path directions from two or more locations of the marine vessel. The vessel location 115 may include the current location of the marine vessel or a potential future location of the marine vessel, such as along the first navigation pathway. For example, the system may be configured to enable a user to select a vessel location 115 along the first pathway, such as by moving the vessel icon 11 along the first navigation pathway, and to input a path direction to modify a portion of the first navigation pathway. Thus, the control system will utilize the path planning algorithm to replan the section of the first navigation pathway around the selected vessel location 115.

In one embodiment, the control system may be configured to receive a series of path directions and to utilize the series of two or more path directions 120 to define the new navigation pathway 130. As an illustrative example, a first swipe on a touch screen of the user interface display 117 defines a first path direction, and a second swipe on a touch screen of the user interface display 117 may be interpreted as defining a subsequent second path direction 120.

The control system may be configured to define navigation pathways based on one or more predetermined priorities, such as the shortest distance between the vessel location and the navigation target location or the most fuel-efficient route. When the control system receives a path direction from a user, the new navigation pathway may be defined using the same constraints, while also accommodating for the received path direction by accounting for the set of cell weights associated with the path direction. The resultant path direction may, by adjusting the set of cell weights associated with the first path direction, define the new navigation pathway in a way that otherwise may not be defined due to these predetermined objectives.

Figure 8:
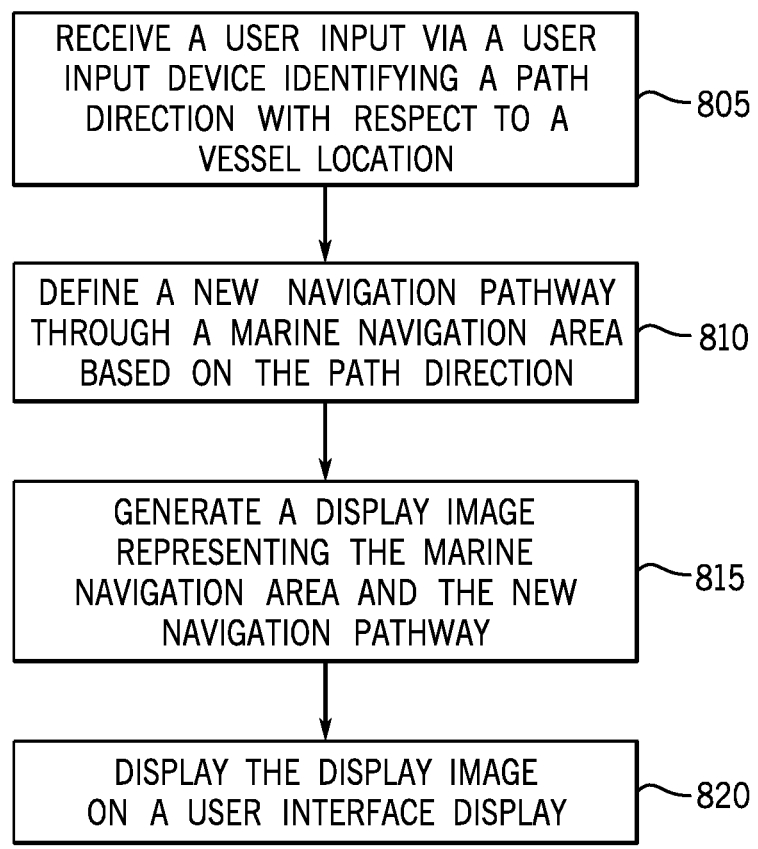
FIGS. 8-10 illustrate exemplary methods for controlling navigation for a marine vessel according to embodiments of the present disclosure.

FIG. 8 illustrates an exemplary method for controlling navigation for a marine vessel. At 805, the control system receives a user input via a user input device identifying a path direction with respect to a vessel location. At 810, the control system defines a new navigation pathway through a marine navigation area based on the path direction. In one embodiment, defining the new navigation pathway includes modifying a first navigation pathway through the marine navigation area based on the path direction inputted by the user. In another embodiment, a portion of the first navigation pathway may be adjusted based on the portion of the first navigation pathway closest to the set of cell weights associated with the inputted path direction. At 815, a display image is generated by the control system representing the marine navigation area and the new navigation pathway. In one embodiment, the user may confirm the new navigation pathway or submit a second path direction. The control system may continue to present new navigation pathways until the user confirms the new navigation pathway. In another embodiment, the control system may receive two or more path directions and define the new navigation pathway based on the two or more inputted path directions. At 820, the control system displays the display image on a user interface display.

Figure 9:
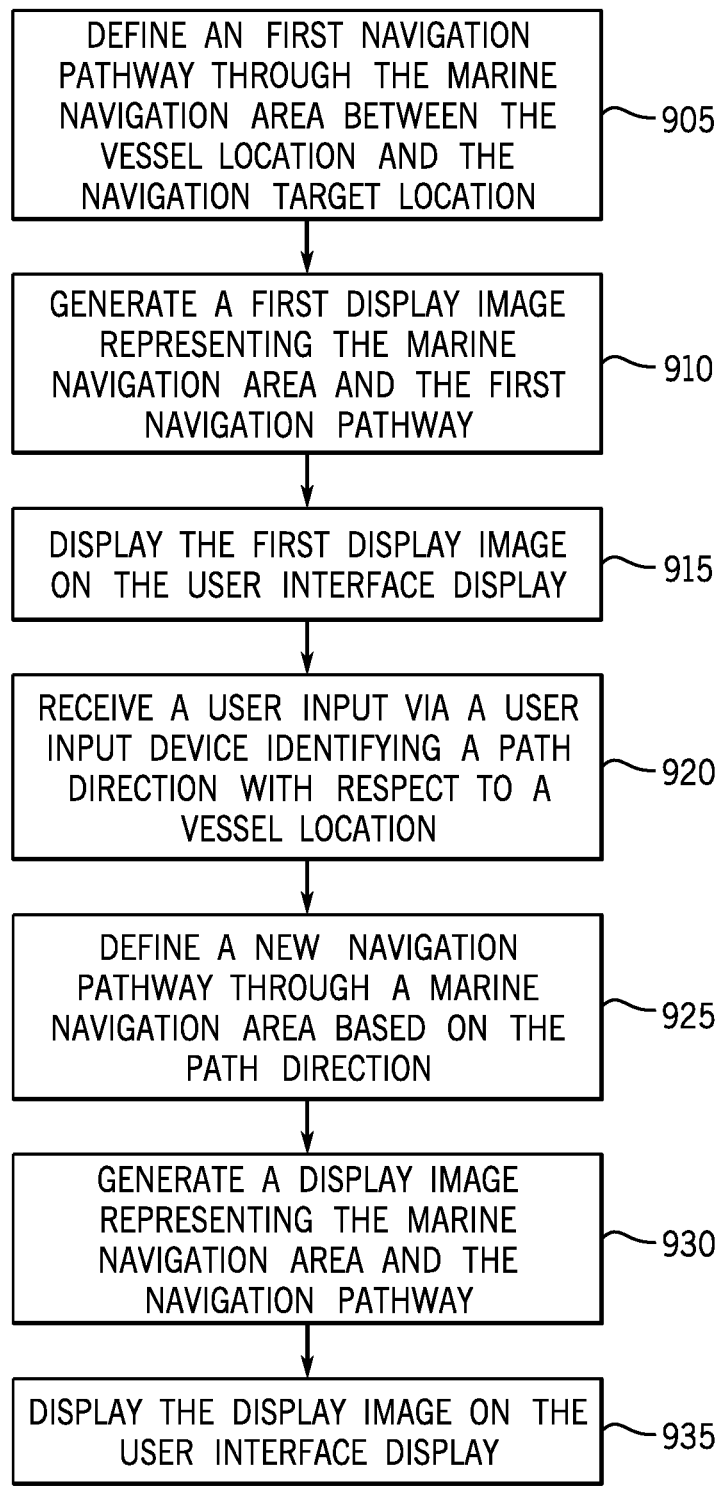

FIG. 9 illustrates an exemplary method for controlling navigation for a marine navigation vessel. At 905, a first navigation pathway through the marine navigation area is defined by the control system, wherein the first navigation pathway is between the vessel location and the navigation target location. At 910, a first display image is generated by the control system representing the marine navigation area and the first navigation pathway. At 915, the first display image is displayed by the control system on a user interface display. At 920, a user input is received by the control system via a user input device identifying a path direction with respect to a vessel location. At 925, a new navigation pathway through a marine navigation area is defined based on the path direction. The new navigation pathway extends in a different direction that the first navigation pathway. At 930, a display image representing the marine navigation area and the new navigation pathway is generated by the control system. At 935, the display image is displayed by the control system on the user interface display.

Figure 10:
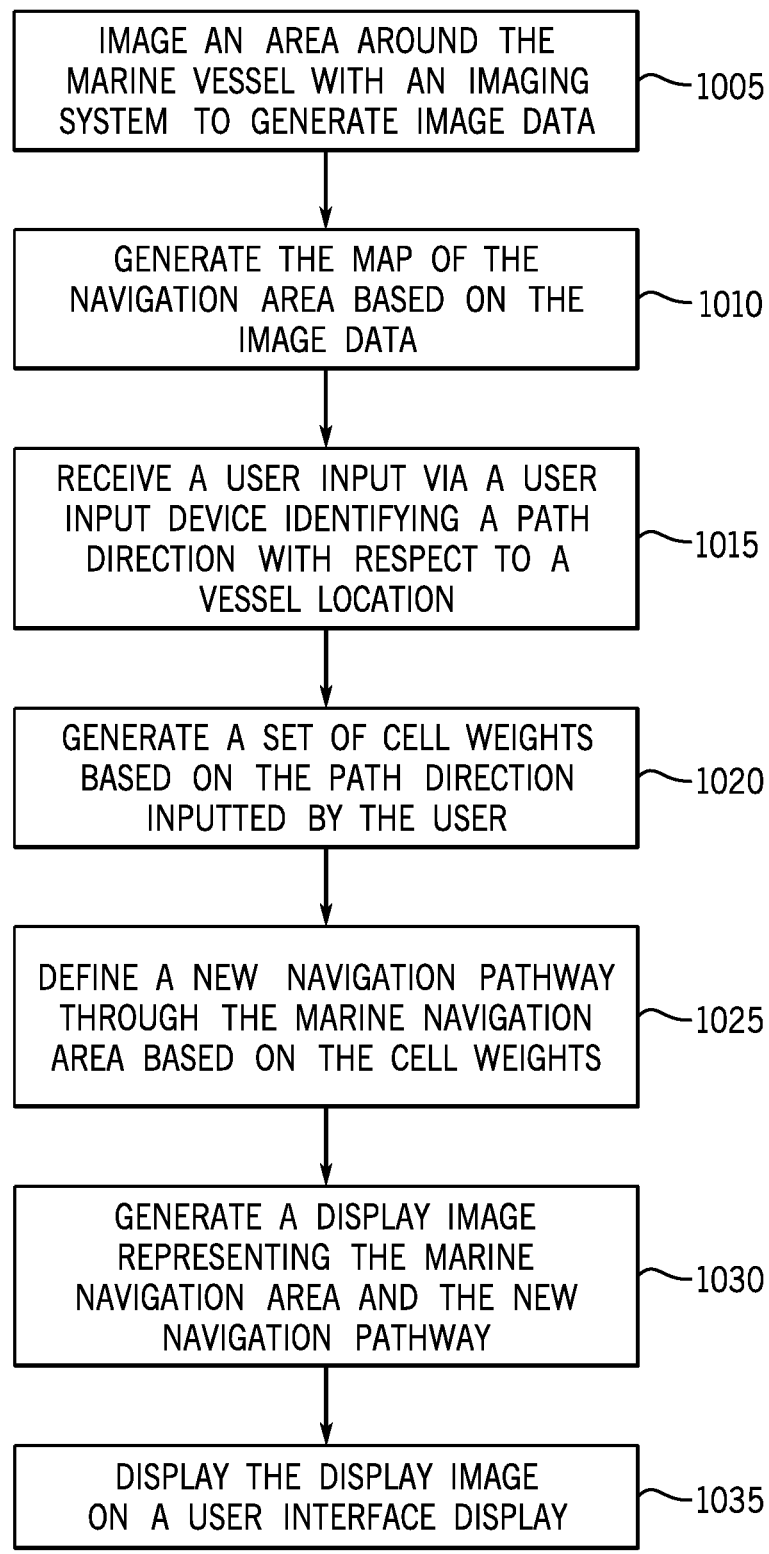

FIG. 10 illustrates an exemplary method for controlling navigation for a marine vessel. At 1005, an area around the marine vessel is imaged by the control system with an imaging system to generate image data. At 1010, the map of the navigation area is generated by the control system based on the image data. At 1015, a user input is received by the control system via a user input device identifying a path direction with respect to a vessel location. At 1020, a set of cell weights is generated by the control system based on the path direction inputted by the user. At 1025, a new navigation pathway through the marine navigation area is defined by the control system based on the set of cell weights such that the new navigation pathway follows the path direction. At 1030, a display image representing the marine navigation area and the new navigation pathway is generated by the control system. At 1035, the display image on a user interface display is displayed by the control system.

In certain embodiments where a first navigation pathway has already been generated, the control system may be configured to assess whether the inputted path direction sufficiently differs from the direction of the first navigation pathway. For example, the control system may be configured to compare the user-inputted path direction to the path direction of the corresponding portion of the first navigation pathway and to only determine the new navigation pathway if the inputted path direction differs from the first navigation pathway by at least a threshold amount. The threshold difference for defining a new navigation pathway or a path direction for a new navigation pathway may be based on a comparison to the set of cell weights associated with the first navigation pathway, such as whether the inputted path direction is outside of the maximum weighted region of the set of cell weights associated with the first navigation pathway. This avoids a situation where the control system defines the new navigation pathway to be the same as the prior navigation pathway. If the difference in path direction is less than the threshold difference, the control system may generate an error alert or otherwise not generate a new navigation.

This written description uses examples to disclose the invention, including the best mode, and to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed.

What is claimed is:

1. A method of controlling navigation for a marine vessel, the method comprising:
    receiving a user input via a user input device identifying a path direction with respect to a vessel location of the marine vessel;
    generating a set of cell weights based on the path direction;
    defining a new navigation pathway through a marine navigation area based on the path direction indicated by the user input, wherein the new navigation pathway includes a set of geographical locations between the vessel location and a navigation target location;
    wherein defining the new navigation pathway includes applying the cell weights to a map of the marine navigation area such that a location proximal to the vessel location and in the path direction receives a maximum weight, and the set of cell weights is configured to decrease as a location angle differs from the path direction;
    generating a display image representing the marine navigation area and the new navigation pathway; and
    displaying the display image on a user interface display.

2. The method of claim 1, further comprising:
    defining a first navigation pathway through the marine navigation area between the vessel location and the navigation target location, wherein the first navigation pathway includes a first set of geographical locations extending in a first direction from the vessel location towards the navigation target location;
    generating a first display image representing the marine navigation area and the first navigation pathway and displaying the first display image on the user interface display; and
    wherein the path direction inputted by a user is different than the first direction such that the new navigation pathway extends in a different direction with respect to the vessel location than the first navigation pathway.

3. The method of claim 1, further receiving a first user input engaging a path modification mode prior to receiving the user input identifying the path direction utilized to define the new navigation pathway.

4. The method of claim 1, wherein defining the new navigation pathway includes modifying a first navigation pathway through the marine navigation area based on the path direction inputted via the user input device.

5. The method of claim 1, wherein the user input device and the user interface display are a touch screen and wherein the user input is a swipe on the touch screen, wherein the path direction with respect to the vessel location is based on a direction of the swipe on the touch screen.

6. The method of claim 5, further comprising determining the direction of the swipe on the touch screen with respect to a pixel location of the vessel location in a first display image representing the marine navigation area and a first navigation pathway.

7. The method of claim 1, wherein the user input device is a joystick and the user input is a joystick tilt away from a centered position, wherein the path direction with respect to the vessel location is based on a direction of the joystick tilt.

8. The method of claim 1, wherein the vessel location is a global position measurement from a global position measurement system describing a current global position of the marine vessel.

9. The method of claim 1, further comprising:
    imaging an area around the marine vessel with an imaging system to generate image data; and
    generating the map of the marine navigation area based on the image data.

10. The method of claim 1, wherein the set of cell weights is configured to decrease as location distance from the vessel location increases.

11. A navigation system for a marine vessel, the system comprising:

a user interface display on a marine vessel;
a control system configured to:
- receive a user input via a user input device identifying a path direction with respect to a vessel location of the marine vessel;
- generate a set of cell weights based on the path direction;
- define a new navigation pathway through a marine navigation area based on the path direction indicated by the user input, wherein the new navigation pathway includes a set of geographical locations between the vessel location and a navigation target location;
- wherein defining the new navigation pathway includes applying the cell weights to a map of the marine navigation area such that a location proximal to the vessel location and in the path direction receives a maximum weight, and the set of cell weights is configured to decrease as a location angle differs from the path direction;
- generate a display image representing the marine navigation area and the new navigation pathway; and
- display the display image on the user interface display.

12. The system of claim 11, wherein the control system is further configured to:
- define a first navigation pathway through the marine navigation area between the vessel location and the navigation target location, wherein the first navigation pathway includes a first set of geographical locations extending in a first direction from the vessel location towards the navigation target location;
- generate a first display image representing the marine navigation area and the first navigation pathway and displaying the first display image on the user interface display; and
- wherein the path direction inputted by a user is different than the first direction such that the new navigation pathway extends in a different direction with respect to the vessel location than the first navigation pathway.

13. The system of claim 11, wherein the control system is further configured to receive a first user input engaging a path modification mode prior to receiving the user input identifying the path direction utilized to define the new navigation pathway.

14. The system of claim 11, wherein the user input device and the user interface display are a touch screen and wherein the user input is a swipe on the touch screen, wherein the path direction with respect to the vessel location is based on a direction of the swipe on the touch screen.

15. The system of claim 14, wherein the control system is further configured to determine the direction of the swipe on the touch screen with respect to a pixel location of the vessel location in a first display image representing the marine navigation area and a first navigation pathway.

16. The system of claim 11, wherein the user input device is a joystick and the user input is a joystick tilt away from a centered position, wherein the path direction with respect to the vessel location is based on a direction of the joystick tilt.

17. The system of claim 11, wherein the vessel location is a global position measurement from a global position measurement system describing a current global position of the marine vessel.

18. The system of claim 11, wherein the control system is further configured to:
- image an area around the marine vessel with an imaging system to generate image data; and
- generate the map of the marine navigation area based on the image data.

19. The system of claim 11, wherein the set of cell weights is configured to decrease as a location angle differs from the path direction.

* * * * *